(No Model.)
G. B. DAVIS.
STEAM COOKER.
No. 550,924. Patented Dec. 3, 1895.
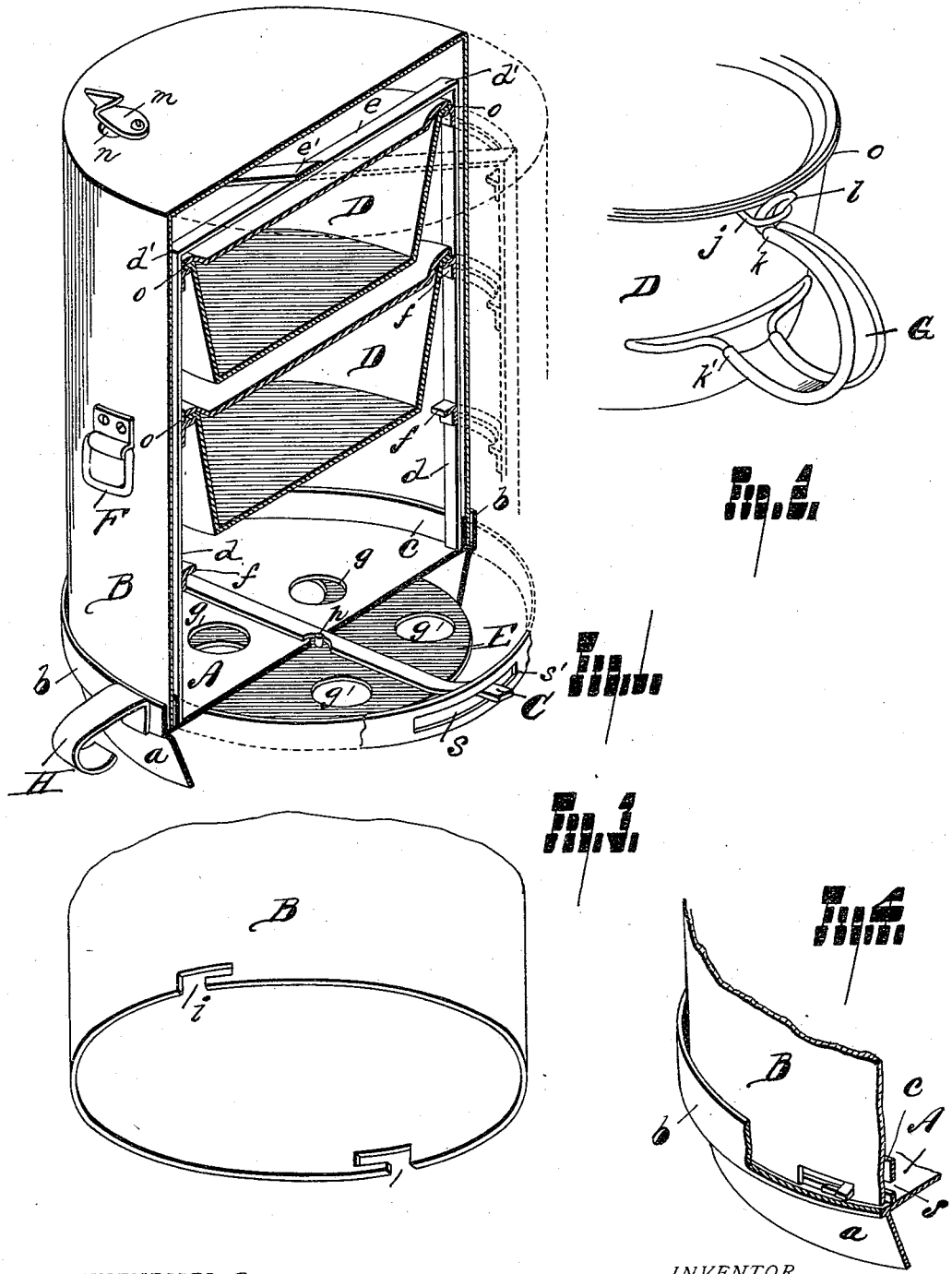
WITNESSES
INVENTOR
George B. Davis

UNITED STATES PATENT OFFICE.

GEORGE B. DAVIS, OF DETROIT, MICHIGAN.

STEAM-COOKER.

SPECIFICATION forming part of Letters Patent No. 550,924, dated December 3, 1895.

Application filed March 26, 1895. Serial No. 543,206. (No model.)

*To all whom it may concern:*

Be it known that I, GEORGE B. DAVIS, a citizen of the United States, residing at Detroit, in the county of Wayne and State of Michigan, have invented a new and useful Steam-Cooker, of which the following is a specification.

My invention relates to improvements in steam-cookers; and the object of my invention is to provide an inexpensive, convenient, and reliable steam-cooker in which the several different articles of food can be cooked at the same time, and so arranged that each article can be examined while cooking without removing any of the others from the cooker or disturbing them, and a cooker in which the steam will be shut off when it is desirable to examine articles being cooked or to remove them from the cooker. I attain these objects by means of the mechanism illustrated in the accompanying drawings, in which—

Figure 1 is a vertical sectional view of my invention, showing the construction of the steam-damper at the bottom. Fig. 2 is a view showing the detachable handle as in use. Fig. 3 is a view of the bottom of the "jacket" or outside of the cooker, and Fig. 4 is a view showing the position of the actuating-bar when the jacket is locked to the bottom of the cooker.

Similar letters refer to similar parts throughout the several views.

The bottom A is a disk, made of tin-plate or other suitable metal, and has the rim $a$ attached to its lower side, near the edge thereof, which slants toward the center of said disk and is for the purpose of keeping the cooker in place when set on a pan or other suitable vessel containing water from which the steam is generated. In this bottom A are the apertures $g$ for the passage of the steam to the cooking-chamber. On the upper side of the said bottom A are attached the two rims $b$ and $c$, the outer one $b$ being for the purpose of arresting the condensed steam that may run down the inside of the jacket B and also to render the adjustment of the said jacket less difficult by forming a guide therefor. To the inner rim $c$ is rigidly attached the standards of the supporting-rack. These standards $d$ are made of a single piece of tin or other suitable metal and are bent at the points $d'$, so that they form three sides of a rectangle and are so attached to the rim $c$ that the upper sides of the rectangles cross each other at an angle much less than a right angle. The standards thus placed have the horizontal parts $e$ rigidly attached together at $e'$, the point where they cross each other, which adds much to the firmness of the rack for the support of the cooking-dishes. To the standards $d$ the cleats $f$ are rigidly attached, each of the said cleats having one end thereof attached to one of the standards and the other end attached to the other standard. The rack thus formed of the standards $d$ and the cleats $f$ provides a suitable support for the cooking-dishes.

On the under side of the bottom A, and at the center thereof, is pivoted the disk E, which is somewhat smaller than the bottom A and is provided with apertures $g'$, which correspond in number and distance apart with the apertures in the bottom A. The rivet $h$ is rigidly attached to the disk E at its center, and after passing through a suitable aperture in the bottom A is rigidly attached to the actuating-bar C, which, in connection with the jacket B, operates the disk E, opening and closing the apertures $g$ in the bottom A, as hereinafter more fully described.

The jacket B is made of tin or other suitable metal, is cylindrical in form, with a closed top and having suitable handles F, by which it can readily be raised and removed from the other parts of the cooker. In the bottom edge of the jacket B are notches in the position and of the form as is plainly shown in Fig. 3. The actuating-bar C is bent upward at each end and passed through the slots $s$ in the rim $c$. When the jacket B is placed in position over the supporting-rack and bottom of the cooker, as in Fig. 1, the extending ends of the bar C are made to enter the notches $i$.

The manner of operating the device for opening and closing the apertures $g$ in the bottom A may be briefly described as follows: The jacket B is placed over the rack supporting the cooking-dishes in such a position that the edge thereof enters the passage between the rims $b$ and $c$, and so that the bar C enters the notches $i$. The jacket is then turned, and the bar being engaged in the notches $i$ is carried along with it until the bar reaches the end of the slot $s$ and is arrested from farther movement in that direction, and by such movement the apertures in the disk E are made to correspond with the openings in the bottom A, and the bar C is forced into the extension of the notches $i$ and assume the position as is plainly shown in Fig. 4, so that the bottom and jacket are firmly and securely locked together, and the whole device can be lifted by the handles F or otherwise. When it is desired to examine any article being cooked, the jacket is turned back until the actuating-bar C strikes against the end of the slot $s$ at $s'$, which movement carries the disk E into a position closing the apertures $g$ and shutting off the steam from the cooking-chamber and unlocking the jacket, so it can be lifted and removed, exposing the cooking-dishes, which can then be examined without annoyance from rising steam.

It will be readily understood that the dishes containing the articles to be cooked will become very hot and difficult to handle in removing from the rack, and as a handle attached to each dish would occupy much space, thus requiring a larger jacket, besides the objection that such a handle would also become hot, I have arranged the detachable handle G. (Shown in Fig. 2.) It is made of a single piece of wire bent in the form as shown and covered with tin or other suitable metal from the turns $k$ to $k'$. The upper end of this handle has the hook $l$, which engages with the staples $j$, rigidly attached to each cooking-dish, while the other end of the handle braces against the side of the dish.

H is the handle attached to the bottom for the purpose of steadying the same when necessary and may be of the form shown or any desired form.

In the top of the jacket B is the vent $n$, simply an aperture provided with the cover $m$, with which to close the same.

The cooking-dishes D are made of tin or other suitable material and have a flange $o$ at the upper rim, which, resting on the cleats $f$, retain the dishes in place. In the drawings I have shown the dishes with covers. These may be used or not, as desired.

While I have described my invention as a steam-cooker, it will readily be seen that it can be used as a hot-air oven for gas, gasoline, or other vapor or oil stoves.

I do not wish it to be understood that I limit myself to the exact form of construction or arrangement of parts as herein described, but hold that changes in form, arrangement of parts, and minor details of construction may be resorted to without departing from the spirit of my invention.

What I claim is—

1. The herein described steam cooker, consisting of the jacket B, the disk bottom A with the apertures $g$, the rims $a$, $b$, and $c$, attached to said bottom, the disk E to which the actuating bar C is attached and arranged, in connection with the jacket B to open and close the apertures in said disk bottom, all substantially as described.

2. In a steam cooker, the combination of a disk bottom with rims attached thereto and in which are apertures for the passage of steam, a disk having corresponding apertures loosely pivoted to the under side of said bottom at the center thereof, said lower disk having an actuating bar attached thereto, with a cover or jacket of cylindrical form, and having notches in the edge thereof to receive the actuating bar, so that by turning said jacket the apertures in the said bottom are opened or closed, all substantially as specified and described.

GEORGE B. DAVIS.

Witnesses:
A. G. NUPPENAU,
B. D. YORK.